United States Patent
Zhao et al.

(10) Patent No.: US 12,527,501 B2
(45) Date of Patent: Jan. 20, 2026

(54) PHOTOELECTRIC PHYSIOLOGICAL SIGNAL ACQUIRING AND PROCESSING DEVICE

(71) Applicant: KINGFAR INTERNATIONAL INC., Beijing (CN)

(72) Inventors: Qichao Zhao, Beijing (CN); Ran Yang, Beijing (CN)

(73) Assignee: KINGFAR INTERNATIONAL INC., Beijing (CN)

( * ) Notice: Subject to any disclaimer, the term of this patent is extended or adjusted under 35 U.S.C. 154(b) by 273 days.

(21) Appl. No.: 18/379,908

(22) Filed: Oct. 13, 2023

(65) Prior Publication Data
US 2024/0215874 A1    Jul. 4, 2024

(30) Foreign Application Priority Data

Dec. 31, 2022    (CN) .................. 202223604859.2
Dec. 31, 2022    (CN) .................. 202223605197.0

(51) Int. Cl.
*A61B 5/1455*      (2006.01)
*A61B 5/00*      (2006.01)

(52) U.S. Cl.
CPC .............. *A61B 5/1455* (2013.01); *A61B 5/72* (2013.01)

(58) Field of Classification Search
CPC ..... A61B 5/1455; A61B 5/72; A61B 5/14552; A61B 5/7225; A61B 5/02427
See application file for complete search history.

(56) References Cited

U.S. PATENT DOCUMENTS

| | | | |
|---|---|---|---|
| 5,638,816 A | * | 6/1997 | Kiani-Azarbayjany ..................... A61B 5/6826 600/316 |
| 5,807,267 A | | 9/1998 | Bryars et al. |
| 9,220,409 B2 | | 12/2015 | Lisogurski |
| 2004/0193026 A1 | | 9/2004 | Scharf |

(Continued)

FOREIGN PATENT DOCUMENTS

| | | |
|---|---|---|
| CN | 102512178 B | 4/2014 |
| WO | 2011117780 A1 | 9/2011 |

OTHER PUBLICATIONS

European Search Report cited in corresponding European Patent Application No. 23203020.5, dated Mar. 7, 2024, 6 pages.

(Continued)

*Primary Examiner* — Paula J Stice
(74) *Attorney, Agent, or Firm* — Cooper Legal Group, LLC

(57) ABSTRACT

The present disclosure provides a photoelectric physiological signal acquiring and processing device including a light source, a photoelectric sensing device, an acquisition unit, an analog-to-digital device, and a microprocessing unit. The acquisition unit includes a current-to-voltage conversion module, a filtering device, and an amplification circuit. The photoelectric sensing device acquires a light transmitted through or reflected by the light source through the human physiological signal acquisition site, and converts it into a current signal. The current-to-voltage conversion module converts the current signal into a voltage signal, the filtering device and the amplification circuit process the voltage signal in sequence, the analog-to-digital device converts a processed voltage signal into a digital signal, and the physiological signal is obtained by the microprocessing unit.

11 Claims, 3 Drawing Sheets

(56) References Cited

U.S. PATENT DOCUMENTS

| | | | |
|---|---|---|---|
| 2013/0324809 A1* | 12/2013 | Lisogurski | A61B 5/7285 |
| | | | 600/323 |
| 2015/0196257 A1 | 7/2015 | Yousefi et al. | |
| 2016/0296129 A1 | 10/2016 | Uematsu | |
| 2017/0049344 A1 | 2/2017 | Terumoto | |
| 2017/0191870 A1* | 7/2017 | Ockenfuss | A61B 5/1459 |
| 2019/0335978 A1* | 11/2019 | Chiba | H04N 23/555 |

OTHER PUBLICATIONS

Kao, Yung-Hua, et al., "Towards maximizing the sensing accuracy of an cuffless, optical blood pressure sensor using a high-order front-end filter", Microsystem Technologies, Apr. 6, 2018, 24: 4621-4630.

Mouradian, V., et al., "Continuous Wearable Health Monitoring using Novel PPG Optical Sensor and Device", e-Health Pervasive Wireless Applications and Services (eHPWAS '14), 2014 IEEE 10th International Conference on Wireless and Mobile Computing, Networking and Communications (WIMOB), IEEE, Oct. 8, 2014, pp. 120-123.

\* cited by examiner

PHOTOELECTRIC PHYSIOLOGICAL SIGNAL ACQUIRING AND PROCESSING DEVICE

CROSS-REFERENCE TO RELATED APPLICATION

The present disclosure is based on and claims the priority benefits of China application No. 202223604859.2, filed on Dec. 31, 2022, and China application No. 202223605197.0, filed on Dec. 31, 2022. The entireties of China application No. 202223604859.2 and China application No. 202223605197.0 are hereby incorporated by reference herein and made a part of this specification.

TECHNICAL FIELD

The present disclosure generally relates to the technical field of physiological signal acquisition, and, in particular, to a photoelectric physiological signal acquiring and processing device.

BACKGROUND ART

A physiological signal acquisition technology in existing technologies is shown in FIG. 3, in which a voltage divider circuit is composed of a fixed resistance value resistance and a photodiode. The photodiode receives a varied optical signal, and the voltage divider circuit receives a varied current to obtain a varied voltage signal. The voltage signal obtained from the voltage divider resistance is output to an analog-to-digital device through a circuit that integrates filtering and amplification, and then to a microprocessing unit, where the physiological signal is regained.

An accuracy of forced current-to-voltage conversion through a voltage divider resistance in the existing technologies depends on the resistance value and accuracy of the voltage divider resistance. Currently, the resistance accuracy of the resistance on the market is mostly 5% or 1%, no higher than 0.1%, therefore, a calculated voltage signal will have errors, which will become larger after passing through the amplification circuit, resulting in errors in a regained physiological signal. In addition, using the circuit that integrates filtering and amplification will also amplify interference signal generated by interference light passing through the photodiode, resulting in amplified interference signal.

Wavelength and intensity of the light used in the physiological signal acquisition in the physiological acquisition device are preset. The technical problem present in the existing technology is that, a reverse current generated by the photodiode is different from the preset value due to a simultaneous irradiation of the light of other wavelengths on the photodiode, thereby interfering with signal acquisition. In an experiment conducted by using an interference light source with a wavelength quite different from that of the preset light source in conjunction with the photodiode, it was found that the photodiode cannot filter out all other lights than a light having desired specific radiation frequency band, still suffering certain interference. By introducing corresponding filtering functions into the designed circuit to filter out the interference light, the filtering device can only achieve an attenuate at a certain rate regarding the light beyond a cutoff frequency, rather than completely filtering out the interference light. Furthermore, a method of introducing the filtering device into the circuit requires knowing a luminous frequency of the interference light source in advance to determine the cutoff frequency of the filtering device on the circuit. If the frequency of the light emitted by the interference light source is similar to the physiological signal of the human body, the interference light cannot be removed by introducing the filtering device into the circuit.

SUMMARY

In view of this, an embodiment of the present disclosure provides a photoelectric physiological signal acquiring and processing device to eliminate or improve one or more defects present in existing technologies.

An aspect of the present disclosure provides a photoelectric physiological signal acquiring and processing device including: a light source, a photoelectric sensing device, an acquisition unit, an analog-to-digital device, and a microprocessing unit; wherein a light of a specific wavelength and light intensity emitted by the light source for acquiring a physiological signal is transmitted through or reflected by a human physiological signal acquisition site before being irradiated on the photoelectric sensing device; the photoelectric sensing device converts an optical signal into a current signal and outputs the current signal to the acquisition unit; the current signal is converted into a processed voltage signal by the acquisition unit, and the voltage signal is output to the analog-to-digital device; the voltage signal is converted into a digital signal by the analog-to-digital device, and the digital signal is output to the microprocessing unit; the data signal is processed by the microprocessing unit to obtain the physiological signal; and the acquisition unit comprises a current-to-voltage conversion module, a filtering device, and an amplification circuit; wherein the current-to-voltage conversion module converts the current signal into the voltage signal and outputs the voltage signal to the filtering device; the filtering device filters the voltage signal and outputs a filtered voltage signal to the amplification circuit; and the amplified circuit amplifies the filtered voltage signal and outputs an amplified voltage signal to the analog-to-digital device.

In some embodiments of the present disclosure, the photoelectric physiological signal acquiring and processing device further includes an optical filtering unit attached to and covering the photoelectric sensing device.

In some embodiments of the present disclosure, the optical filtering unit is selected as an optical filter with one or more layers according to a use scenario of the photoelectric physiological signal acquiring and processing device.

In some embodiments of the present disclosure, the optical filtering unit and the photoelectric sensing device are correspondingly selected so that a wavelength range of the light passing through the optical filtering unit is within a spectral response range of the photoelectric sensing device.

In some embodiments of the present disclosure, the photoelectric physiological signal acquiring and processing device further includes a power controller configured for controlling a switch of the light source.

In some embodiments of the present disclosure, when the power controller controls the light source to turn on, the light source emits the light, and the microprocessing unit receives a first digital signal; when the power controller controls the light source to turn off, the light source emits no light, and the microprocessing unit receives a second digital signal; and the microprocessing unit processes a difference between the first digital signal and the second digital signal to obtain the physiological signal.

In some embodiments of the present disclosure, the power controller is selected as a multiplexer controlling switches of the light source and the microprocessing unit respectively.

In some embodiments of the present disclosure, the photoelectric sensing device is selected as a photodiode.

In some embodiments of the present disclosure, the current-to-voltage conversion module is selected a trans-impedance amplifier.

In some embodiments of the present disclosure, the photoelectric physiological signal acquiring and processing device further includes a housing, wherein the housing is wrapped outside the photoelectric sensing device, at a position beyond irradiation of the light emitted by the light source and transmitted through or reflected from the human physiological signal acquisition site.

In some embodiments of the present disclosure, the light emitted by the light source comprises one or more light rays including specific wavelength and light intensity required for the physiological signal acquisition.

In some embodiments of the present disclosure, the light source includes a single light source or multiple light sources.

In some embodiments of the present disclosure, when a green light emitted by the light source is used for acquiring the physiological signal, the photodiode is selected as a photodiode having a peak wavelength of 530 nm±10 nm, and the optical filter is correspondingly selected as an optical filter having a main wavelength of 530 nm.

A photoelectric physiological signal acquiring and processing device of the present disclosure ensures a conversion accuracy of the current signal into the voltage signal by using a current-to-voltage conversion module. Passing the voltage signal is sequentially through the filtering device and the amplification circuit avoids a problem of amplifying the interference signal which otherwise would be present in a circuit having integrated filtering and amplifying. The present disclosure improves the accuracy of the physiological signal acquisition by adjusting the acquisition unit.

In addition, the present disclosure wraps the outside of the photoelectric sensing device with a corresponding optical filtering unit, which can selectively pass through the light within a certain wavelength range, thereby filtering out some light interference in the ambient light beyond the wavelength range required for the physiological signal acquisition, improving the accuracy of the optical signal acquired by the photoelectric sensing device, and improving the accuracy of the physiological signal acquisition.

The present disclosure further acquires the physiological signal when only ambient light exists and the physiological signal when both ambient light and light source emit light separately, through the difference between the digital signal acquired in both cases, an interference caused by the ambient light on the physiological signal acquisition is removed, thereby improving the accuracy of the physiological signal acquisition.

Additional advantages, purposes, and features of the utility model will be partially explained in the following description, and will become apparent to those ordinary skilled in the art after studying the following text, or can be learned according to a practice of the utility model. The purpose and other advantages of the utility model can be achieved and obtained through the specific structure indicated in the description and accompanying drawings.

Those skilled in the art will understand that the purposes and advantages that can be achieved by the utility model are not limited to the specific descriptions above, and according to the following detailed explanations, the above and other purposes that can be achieved by the utility model will be more clearly understood.

BRIEF DESCRIPTION OF THE DRAWINGS

The accompanying drawings described herein are intended to provide a further understanding of the present disclosure and form a part of the present disclosure, and do not form a limitation of the present disclosure. Components in the accompanying drawings are not drawn proportionally, but only to illustrate the principles of the present disclosure. In order to facilitate illustration and description of some parts of the present disclosure, corresponding parts in the accompanying drawings may be amplified, that is, they may become larger compared to other components in an exemplary device actually manufactured according to the present disclosure. In the accompanying drawings.

DETAILED DESCRIPTION

In order to make a purpose, a technical solution, and an advantage of the present disclosure more clearly, the following will be further described in detail below with reference to accompanying drawings and embodiments. Herein, schematic embodiments and explanations of the present disclosure are only used to explain the present disclosure and are not intended to limit it.

Herein, it should also be noted that in order to avoid blurring the present disclosure due to unnecessary details, only structures and/or processing steps closely related to a scheme according to the present disclosure are shown in the accompanying drawings, while other details that are not closely related to the present disclosure are omitted.

It should be emphasized that the term "including/containing" when used in the article refers to an existence of features, elements, steps, or components, but does not exclude the existence or attachment of one or more other features, elements, steps, or components.

Here, it should also be noted that, if there are no special instructions, the term "connection" in the article can not only refer to a direct connection, but also to an indirect connection with an intermediate object.

In the following text, the embodiments of the present disclosure will be described with reference to the accompanying drawings. In the accompanying drawings, the same reference signs represent the same or similar components, or the same or similar steps.

Figure 1:
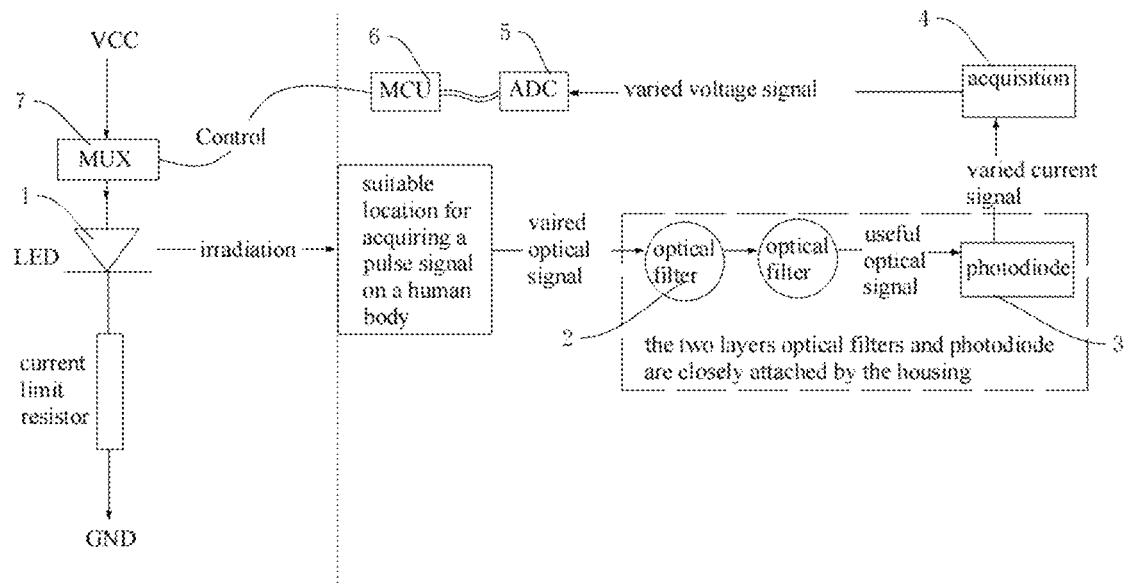
FIG. 1 is a structure view of a photoelectric physiological signal acquiring and processing device in an embodiment according to the present disclosure.

Referring to FIG. 1, the present disclosure provides a photoelectric physiological signal acquiring and processing device, which includes a light source 1, a photoelectric sensing device 3, an acquisition unit 4, an analog-to-digital device 5, and a microprocessing unit 6. Light having a specific wavelength and a light intensity emitted by the light source 1 and required for acquiring a physiological signal is transmitted through or reflected by a human physiological signal acquisition site before being irradiated on the photoelectric sensing device 3. The photoelectric sensing device 3 converts an optical signal into a current signal and outputs the current signal to the acquisition unit 4, for example, an acquisition circuit. The current signal is converted into a processed voltage signal by the acquisition unit 4, and the voltage signal is output to the analog-to-digital device 5. The voltage signal is converted into a digital signal by the analog-to-digital device 5, and the digital signal is output to the microprocessing unit 6. A data signal is processed by the microprocessing unit 6 to obtain the physiological signal. In particular, the physiological signal can be a pulse signal or a blood oxygen signal. The human physiological signal acquisition site refers to a skin that can be irradiated by the light emitted by the light source 1 at any point in the human body.

The light source 1 is configured to emit a light of a specific wavelength and light intensity required for acquiring the physiological signal; and the light source 1 can use a single light source or multiple light sources to emit the light. The light emitted by the light source 1 includes one or more light rays, including those having specific wavelength and light intensity required for the physiological signal acquisition. The wavelength of the light emitted by the light source 1 is a preset light wavelength suitable for the physiological signal acquisition, which is selected according to a wavelength range of a visible spectrum.

The photoelectric sensing device 3 is configured to acquire the light signal formed by the light transmitted through or reflected by the human physiological signal acquisition site, and convert an acquired varied light signal into a varied current signal. Selection of the photoelectric sensing device 3 depends on the wavelength of the light emitted by the light source 1 required for acquiring the physiological signal, and a peak wavelength of the photoelectric sensing device 3 is determined by the specific wavelength of the light emitted by the light source 1 for acquiring the physiological signal.

Figure 2:
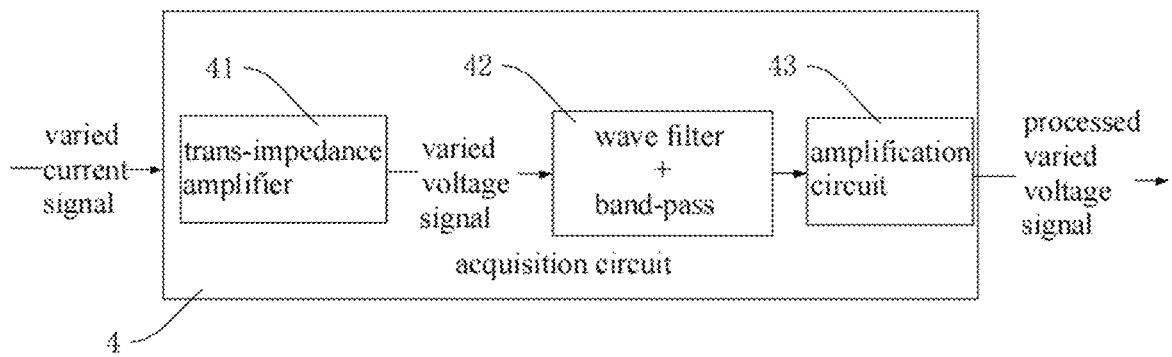
FIG. 2 is a structure view of an acquisition unit in an embodiment according to the present disclosure.
Figure 3:
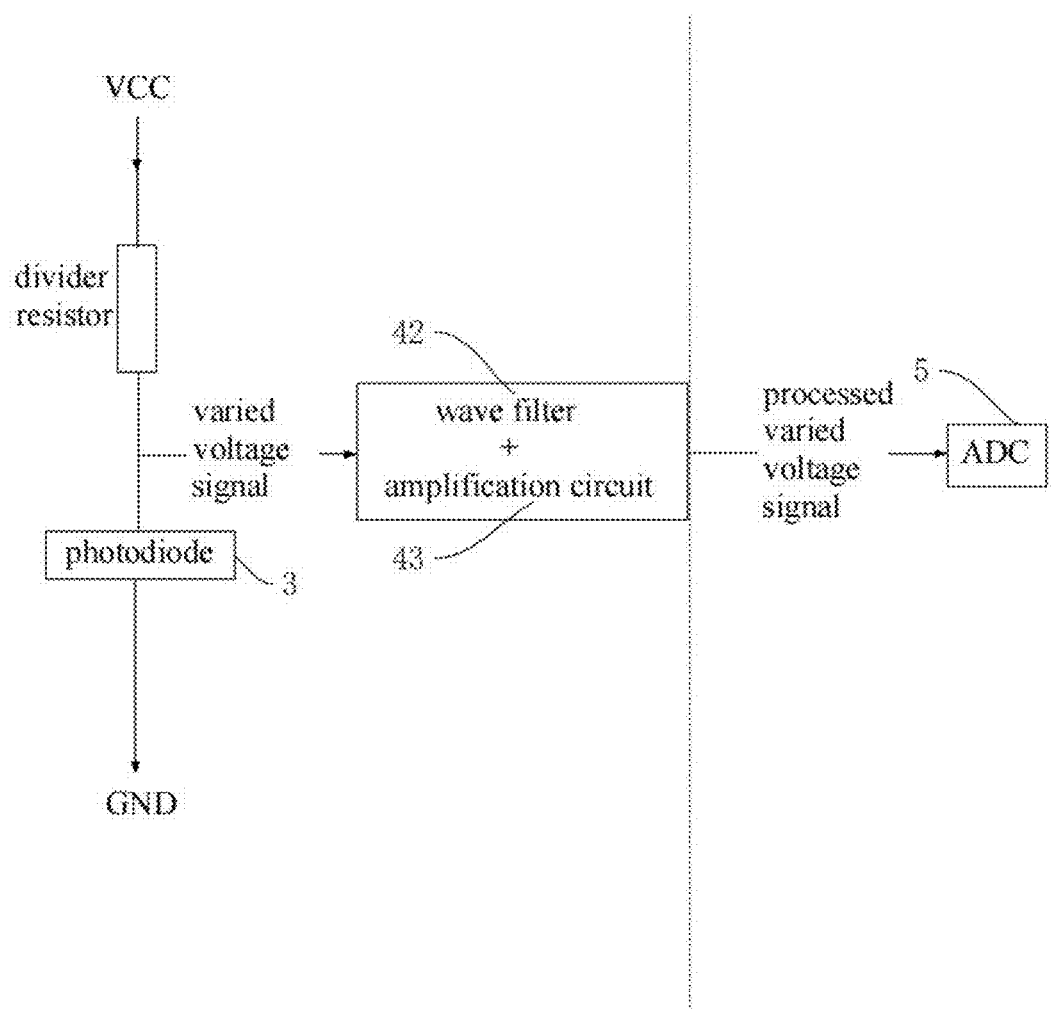
FIG. 3 is a structure view of a physiological signal acquisition device in existing technologies.

The acquisition unit 4 is configured for filtering and amplifying the varied current signal to obtain a processed varied voltage signal. Referring to FIG. 2, the acquisition unit 4 includes a current-to-voltage conversion module 41, a filtering device 42, and an amplification circuit 43. The current-to-voltage conversion module 41 converts a current signal into a voltage signal and outputs the voltage signal to the filtering device 42. The filtering device 42 filters the voltage signal and outputs a filtered voltage signal to the amplification circuit 43. The amplification circuit 43 amplifies the filtered voltage signal and outputs the amplified voltage signal to the analog-to-digital device 5.

In an embodiment, the current-to-voltage conversion module 41 is a trans-impedance amplifier; the filtering device 42 is a band-pass filter which only allows the passing through of an electrical signal having a specific frequency band that is generated by irradiating the light having the specific wavelength and light intensity emitted by the light source 1 for acquiring the physiological signal on the photoelectric sensing device 3. Due to a possible presence of an interference light other than the light emitted by the light source 1 in the optical signal acquired by a photoelectric converter, there may also be a current signal converted from the interference light present in a converted current signal. Therefore, during a process of utilizing the trans-impedance amplifier to process the varied current signal, only current-to-voltage conversion is performed, that is, converting a varied current signal into a varied voltage signal, without amplifying the varied current signal, thereby avoiding amplifying the interference signal during signal conversion. Since there may still be the voltage signal converted from the interfering light present in the voltage signal formed by a conversion of the trans-impedance amplifier, the varied voltage signal is firstly filtered through the band-pass filter firstly, so as to further filter out the voltage signal converted from the interference signal in the varied voltage signal, and then a filtered voltage signal is amplified by the amplification circuit 43 to obtain a processed varied voltage signal. This avoids a problem of simultaneously amplifying the interference signal in a circuit with integrated filtering and amplification.

In the above embodiment, when the photoelectric physiological signal acquiring and processing device is used to acquire a pulse signal, a frequency of the pulse signal is in a range of 0.1-40 Hz, and a spectrum is in a range of 0-20 Hz. Therefore, a passband of the band-pass filter is in a range of 0.1-20 Hz, which ensures that the pulse signal can pass through and other interference signals will be attenuated.

The analog-to-digital device 5 is configured to convert the processed voltage signal into a digital signal and transmit the digital signal to the microprocessing unit 6.

The microprocessing unit 6 is configured to receive the digital signal from the analog-to-digital device 5 and regain a corresponding acquired physiological signal from the received digital signal.

In an embodiment, the photoelectric physiological signal acquiring and processing device is configured to acquire the pulse signal. The photoelectric sensing device 3 adopts a photodiode, and the light source 1 adopts a light emitting diode to emit a light having a specific wavelength and light intensity required for acquiring the pulse signal. The light source 1 is closely attached to a position on human skin where light rays transmitted through or reflected by a human pulse signal acquisition site irradiates, so as to acquire the light transmitted through or reflected by a human pulse signal acquisition site, so as to minimize an acquisition of a signal from an environmental light as much as possible. The photodiode converts an acquired varied optical signal into a varied current signal, the varied current signal is converted into a varied voltage signal via the trans-impedance amplifier, the varied voltage signal is filtered through the band-pass filter, and the filtered voltage signal is amplified by the amplification circuit 43 to obtain a processed varied voltage signal. The varied voltage signal is converted into a corresponding digital signal through an analog-to-digital converter and transmitted to the microprocessing unit 6, the microprocessing unit 6 regains the acquired pulse signal according to the obtained digital signal. In particular, a specific principle includes utilizing the converted voltage signal to obtain a corresponding PPG waveform (photoplethysmography), thereby obtaining a corresponding pulse signal.

Figure 6:
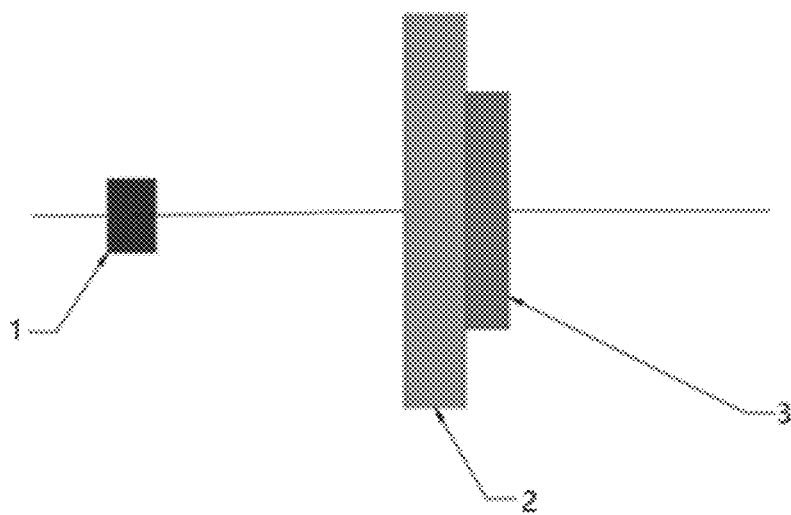
FIG. 6 is a schematic structure view of a light source, an optical filtering unit, and a photoelectric sensing device in an embodiment according to the present disclosure.

In a physiological signal acquisition experiment, due to the fact that a spectral response range of the photodiode only refers to the wavelength range of a most sensitive spectral response of the photodiode, it cannot completely filter out the light of other wavelengths outside the spectral response range. Therefore, the light of different wavelengths emitted by the light source 1 will interfere with the physiological signal acquisition, resulting in inaccurate acquisition of physiological signal data. The existing technology can only achieve a certain degree of attenuation of the optical signals that generate interference regarding a problem of mutual interference between multiple optical signals of different wavelengths, and cannot completely filter out the interference signal, so it cannot effectively solve the interference problem mentioned above. Referring to FIG. 1 and FIG. 6, the photoelectric physiological signal acquiring and processing device mentioned above further includes an optical filtering unit 2, which closely attaches and covers the photoelectric sensing device 3. The optical filtering unit 2 adopts an optical filter, in which a number of the optical filter may not necessarily be two layers, and, instead, can be selected as having more than one layer of closely connected optical filters according to an usage scenario of the photoelectric physiological signal acquiring and processing device. By filtering out an ambient light, an impact of the light of other wavelengths than the specific wavelength set for acquiring the physiological signal on the physiological signal acquisition is eliminated. In particular, an band range that allows the light passing through each layer optical filter of a multi-layer optical filter includes the wavelength of the light required for the physiological signal acquisition. A refractive index of a single-layer optical filter is generally around 92%. When the light source 1 only emits the light required for the physiological signal acquisition, and the light in the scenario is relatively weak, and only the single-layer filter can be selected to shield the interference light. When the light in the usage scenario is relatively chaotic and the light intensity is high, the single-layer filter may not be able to completely shield the light of other wavelengths required for the physiological signal acquisition, therefore, the multi-layer filters can be selected to better shield an influence of other lights beyond a required wavelength, such as a double-layer filter, a three-layer filter, etc.

Figure 4:
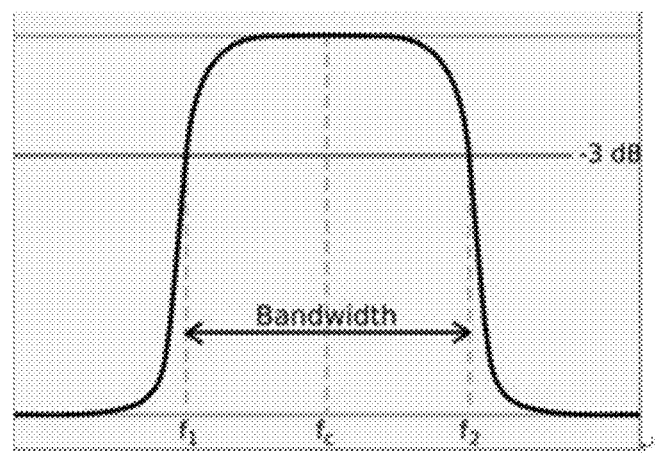
FIG. 4 is a schematic view of a radiation wave band of a light that can pass through an optical filtering unit.

A principle of the optical filtering unit 2 is to prepare the unit by adding special dyes to a plastic or a glass substrate or plate an optical film on its surface, so as to attenuate or absorb certain light bands in a light wave, or to accurately select a small range of the light wave to pass through, while a reflector may absorb other unwanted wave bands. Taking a main wavelength selected for a selection of the optical filtering unit 2 as an example, when different lights of the wavelengths are irradiated on the optical filtering unit 2, only the lights from the small range of radiation wave bands near the main wavelength is allowed to pass through, while the lights of other wave bands are absorbed or reflected. Referring to FIG. 4, if the main wavelength of the optical filtering unit 2 is $f_c$, the wavelength range of the light that can pass through the optical filtering unit 2 is f1-f2, and the light intensity of other wavelengths will be significantly weakened. A shading rate of the optical filtering unit 2 is generally around 92%, and an use of multi-layer optical filtering unit 2 can improve the shading rate and better shield an impact of other wavelengths of the light outside the passband of the optical filtering unit 2. The photodiode is based on the peak wavelength of the selected photodiode. When the lights of different wavelengths are irradiated on the photodiode, the photodiode has a most sensitive spectral response to the light in a vicinity of the peak wavelength, and the wavelength range with the most sensitive spectral response is the spectral response range of the photodiode. In the photoelectric physiological signal acquiring and processing device, the lights of the different wavelengths emitted by the light source 1 are irradiated on the optical filter, and the peak wavelength of the photodiode matches the main wavelength of a corresponding optical filter, so that the wavelength range of the light that can pass through the optical filter is within the spectral response range of a corresponding photodiode, the optical filter and the photodiode used in combination serve as a secondary shielding for the interference light, thereby significantly reducing or even avoiding the interference light outside the spectral response range of the photodiode from irradiating on the photodiode, affecting a reverse current generated by the photodiode.

The selection of the optical filtering unit 2 and the photoelectric sensing device 3 are correspondingly selected so that the wavelength range of the light that can pass through the optical filtering unit 2 is within the spectral response range of the photoelectric sensing device 3.

For example, when the light required for the physiological signal acquisition is a green light, according to the wavelength range of the visible spectrum, a selection standard for setting the photodiode is the peak wavelength of 530 nm±10 nm, and the selection standard of the corresponding optical filter is the main wavelength of 530 nm. The optical filter only allows the green light with the wavelength of around 530 nm to pass through, and the green light passing through the optical filter is within the spectral response range of the corresponding photodiode, thereby directly preventing the light from other radiation wave bands from irradiating on the photodiode and ensuring an accuracy of the physiological signal acquisition.

Corresponding to the above embodiment, the optical filtering unit 2 is selected as a band-pass optical filter, and the photoelectric sensing device 3 is selected as the photodiode. Firstly, the specific wavelength and corresponding light intensity of the light used to acquire the pulse signal are determined, and types of the band-pass optical filter and photodiode according to the wavelength of the light emitted by the light source 1 are selected, so that only the light of the specific wavelength is allowed to pass through. In the embodiment, the light emitting diode is used to emit the lights of the specific wavelength and the light intensity for acquiring the pulse signal, the light emitted by light source 1 irradiates on the human body at a location suitable for acquiring the pulse signal, such as an earlobe or a finger. The light signal that is not absorbed by a blood tissue at the pulse signal acquisition site through a transmission or reflection of the light, and is irradiated on the photodiode covered with the band-pass optical filter; the transmitted through or reflected light emitted by the light source 1 passing through the human pulse signal acquisition site is first shaded by the band-pass filter, and then secondary shielded by the photodiode to obtain the required varied current signal. Due to the fact that the shading rate of the optical filtering unit 2 and a shielding rate of the photodiode cannot reach 100%, in the acquisition unit 4, according to the above embodiment, the obtained digital signal can be transmitted to the microprocessing unit 6 through the trans-impedance amplifier, the filtering device 42, the amplification circuit 43, and the analog-to-digital device 5 in sequence, and the microprocessing unit 6 can regain a acquired pulse signal according to the obtained digital signal.

Referring to FIG. 1, the photoelectric physiological signal acquiring and processing device mentioned above further includes a power controller 7, which controls on and off of the light source 1. When the power controller 7 controls the light source 1 to turn on, the light source 1 emits the light, and the microprocessing unit 6 receives a first digital signal, at this time, the optical signal acquired by the photoelectric converter corresponding to the first digital signal includes the light emitted by the light source 1 and the interference light in the environment. When the power controller 7 controls the light source 1 to turn off, the light source 1 does not emit the light, and the microprocessing unit 6 receives a second digital signal, at this time, the optical signal acquired by the photoelectric converter corresponding to the second digital signal includes the interference light in the environment; the microprocessing unit 6 processes a difference between the first digital signal and the second digital signal to obtain the physiological signal. The digital signal corresponding to the interference light in the environment is subtracting from the light emitted by the light source 1 and the digital signal corresponding to the interference light in the environment acquired by the photoelectric converter, thereby eliminating the impact of the ambient light with the same wavelength as the set light for acquiring the physiological signal on the physiological signal acquisition.

Corresponding to the above embodiment, the power controller 7 is selected as a multiplexer, which controls on and off of the light source 1 and the microprocessing unit 6 respectively. Firstly, the photodiode is turned on through the multiplexer to emit the specific wavelength and the light intensity set for acquiring the pulse signal, at this time, the optical signal acquired by the photoelectric sensing device 3 includes the light emitted by the light source 1 and transmitted through or reflected by the human pulse signal acquisition site and the interference light in the environment, and a corresponding analog-to-digital device 5 obtains the digital signal of a current time period and transmits it to the microprocessing unit 6. Afterwards, the light emitting diode is turned off by the multiplexer, and after an afterglow of the light emitted by the photodiode has completely faded, the optical signal acquired by the photoelectric sensing device 3 includes the interference light in the environment, and the corresponding analog-to-digital device 5 obtains the digital signal of the current time period and transmits it to the microprocessing unit 6. In the microprocessing unit 6, the digital signal acquired in a previous time period is subtracted from the digital signal acquired in a following time period to obtain the digital signal from which interference of the ambient light is removed, the microprocessing unit 6 processes the digital signal from which interference of the ambient light is removed and regains the pulse signal.

An application environment of the photoelectric physiological signal acquiring and processing device should avoid the environment where the ambient light is too intense and a flashing frequency is too fast, ensuring a filtering efficiency of the optical filtering unit 2 for the ambient light, and ensuring the accuracy of acquiring the same wavelength of the light in the ambient light as the set light for acquiring the physiological signal.

Figure 5:
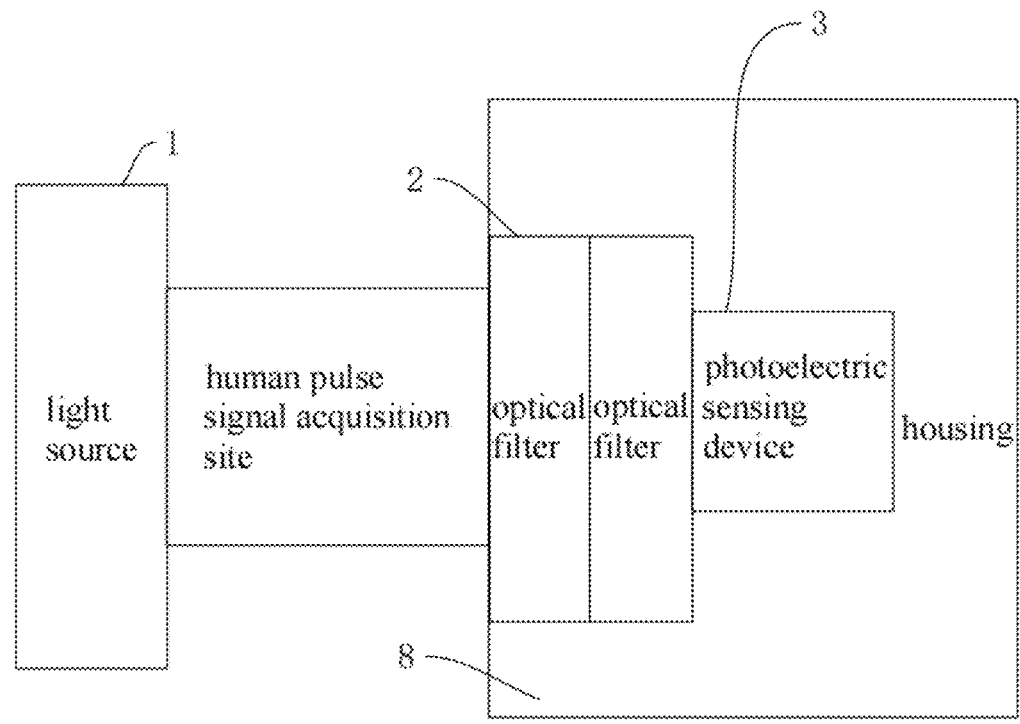
FIG. 5 is a positional view of a light source and a photoelectric sensing device in an embodiment according to the present disclosure.

Referring to FIG. 5, the photoelectric physiological signal acquiring and processing device mentioned above further includes a housing 8, which is wrapped at a position outside the photoelectric sensing device 3 that is not irradiated by the light emitted by the light source 1 and transmitted through or reflected light through the human physiological signal acquisition site.

In the embodiment, a size of the optical filtering unit 2 is larger than that of the photodiode, and the photodiode and the optical filtering unit 2 are closely attached together. The housing 8 completely covers a position outside of the optical filtering unit 2 and the photodiode receiving projected or reflected light, ensuring that the photodiode does not receive the light signals of other wavelengths as much as possible, thereby acquiring more accurate physiological signals.

Those skilled in the art should understand that the exemplary components, systems, and methods described in conjunction with the disclosed embodiments can be executed in the hardware, software, or a combination of the two. Whether to execute it in the hardware or software depends on a specific application and design constraints of the technical solution. Professional and technical personnel can use different methods to achieve the described functions for each specific application, but such implementation should not be considered beyond the scope of the present disclosure. When executed in the hardware, it can be, for example, electronic circuits, application specific integrated circuits (ASICs), appropriate firmware, plugins, function cards, etc. When executed in software, the elements of the present disclosure are programs or code segments configured to execute the required tasks. The programs or the code segments can be stored in the machine readable media, or transmitted on transmission medium or communication links through the data signals carried by carriers.

It should be understood that the present disclosure is not limited to the specific configurations and processes described above and shown in the figures. For simplicity, detailed descriptions of known methods have been omitted herein. In the above embodiments, several specific steps are described and shown as examples. However, the method process of the present disclosure is not limited to the specific steps described and shown. Those skilled in the art can make various changes, modifications, additions, or change an order between the steps after understanding a spirit of the present disclosure.

In the present disclosure, the features described and/or exemplified for the embodiment can be used in the same or similar manner in one or more other embodiments, and/or combined or replaced with the features of other embodiments.

The above are the preferred embodiments of the present disclosure, which are not intended to limit the protection scope of the present disclosure, for those skilled in the art, the embodiments of the present disclosure may have various modifications and variations. Any modifications, equivalent replacements, improvements, etc. made within the spirit and principles of the present disclosure should be covered within the protection scope of the present disclosure.

LIST OF REFERENCE SIGNS

1. Light source
2. Optical filtering unit
3. Photoelectric sensing device
4. Acquisition unit
41. Current-to-voltage conversion module
42. Filtering device
43. Amplification circuit
5. Analog-to-digital device
6. Microprocessing unit
7. Power controller
8. Housing

What is claimed is:

1. A photoelectric physiological signal acquiring and processing device, comprising: a light source, a photoelectric sensing device, an acquisition unit, an analog-to-digital device, a microprocessing unit, and a power controller configured for controlling on and off of the light source;
wherein a light of at least one of a specific wavelength or light intensity emitted by the light source for acquiring a physiological signal is transmitted through or reflected by a human physiological signal acquisition site and irradiated on the photoelectric sensing device;
the photoelectric sensing device converts an optical signal into a current signal and outputs the current signal to the acquisition unit;

the current signal is converted into a processed voltage signal by the acquisition unit, and the processed voltage signal is output to the analog-to-digital device; the processed voltage signal is converted into a digital signal by the analog-to-digital device, and the digital signal is output to the microprocessing unit; and the digital signal is processed by the microprocessing unit to obtain the physiological signal;

the acquisition unit comprises a current-to-voltage conversion module, a filtering device, and an amplification circuit;

the current-to-voltage conversion module converts the current signal into the processed voltage signal and outputs the processed voltage signal to the filtering device;

the filtering device filters the processed voltage signal and outputs a filtered voltage signal to the amplification circuit, and the amplification circuit amplifies the filtered voltage signal and outputs an amplified voltage signal to the analog-to-digital device; and the power controller is selected as a multiplexer controlling on and off of the light source and the microprocessing unit, respectively.

2. The device according to claim 1, further comprising an optical filtering unit attached to and covering the photoelectric sensing device.

3. The device according to claim 2, wherein the optical filtering unit is selected as an optical filter with one or more layers according to ambient light intensity.

4. The device according to claim 2, wherein the optical filtering unit and the photoelectric sensing device are correspondingly selected so that a wavelength range of the light passing through the optical filtering unit is within a spectral response range of the photoelectric sensing device.

5. The device according to claim 2, further comprising a housing, wherein the housing covers a position where the optical filtering unit and the photoelectric sensing device fail to receive projected or reflected light from the human physiological signal acquisition site.

6. The device according to claim 3, wherein the photoelectric sensing device is selected as a photodiode; when a green light emitted by the light source is used for acquiring the physiological signal, the photodiode is selected as a photodiode having a peak wavelength of 530 nm±10 nm, and the optical filter is correspondingly selected as an optical filter having a main wavelength of 530 nm.

7. The device according to claim 1, wherein, when the power controller controls the light source to turn on, the light source emits the light, and the microprocessing unit receives a first digital signal; when the power controller controls the light source to turn off, the light source emits no light, and the microprocessing unit receives a second digital signal; and the microprocessing unit processes a difference between the first digital signal and the second digital signal to obtain the physiological signal.

8. The device according to claim 1, wherein the photoelectric sensing device is selected as a photodiode.

9. The device according to claim 1, wherein the current-to-voltage conversion module is selected as a trans-impedance amplifier.

10. The device according to claim 1, wherein the light emitted by the light source comprises one or more light rays including specific wavelength and light intensity required for physiological signal acquisition.

11. The device according to claim 1, wherein the light source comprises a single light source or multiple light sources.

* * * * *